United States Patent [19]

Hurley

[11] Patent Number: 4,838,427
[45] Date of Patent: Jun. 13, 1989

[54] SHIPPING PROTECTOR

[76] Inventor: Richard D. Hurley, 3210 NW. McKinley Dr., Corvallis, Oreg. 97330

[21] Appl. No.: 224,365

[22] Filed: Jul. 26, 1988

[51] Int. Cl.⁴ .................. B29C 49/00; B29C 51/00; B65D 81/02; B65D 85/30
[52] U.S. Cl. ................... 206/586; 206/326; 206/453; 217/69; 229/DIG. 1; 264/554
[58] Field of Search ............ 206/586, 326, 453; 217/69; 229/DIG. 1; 264/554, 553

[56] References Cited

U.S. PATENT DOCUMENTS

| | | | |
|---|---|---|---|
| 1,283,079 | 10/1918 | Cochrane | 217/69 |
| 3,137,087 | 6/1964 | Shroyer | 206/586 X |
| 3,511,464 | 5/1970 | Doll | 206/586 X |
| 3,655,113 | 4/1972 | Carroll | 206/586 X |
| 3,725,176 | 4/1973 | Doll | 206/586 X |
| 3,725,188 | 4/1973 | Kalt | 229/DIG. 1 |
| 3,762,626 | 10/1973 | Dorsey | 206/586 |
| 3,817,806 | 6/1974 | Anderson et al. | 264/554 X |
| 3,939,239 | 2/1976 | Valyi | 264/554 X |
| 3,946,868 | 3/1976 | Rutter | 206/586 X |
| 4,120,441 | 10/1978 | Hurley | 206/586 |
| 4,250,137 | 2/1981 | Riedler | 264/554 |
| 4,477,243 | 10/1984 | Wallsten | 264/553 |

Primary Examiner—William Price
Attorney, Agent, or Firm—Dellett, Smith-Hill & Bedell

[57] ABSTRACT

A shipping protector for interposition between a shipping container and an object being shipped is provided with an interior layer of resilient plastic foam material which is self adherent to the pulp protector. The plastic foam material is vacuum formed into the interior of the pump base member and is conformed to the interior relief of the base member for resiliently receiving an object being shipped between pads of the base member.

12 Claims, 2 Drawing Sheets

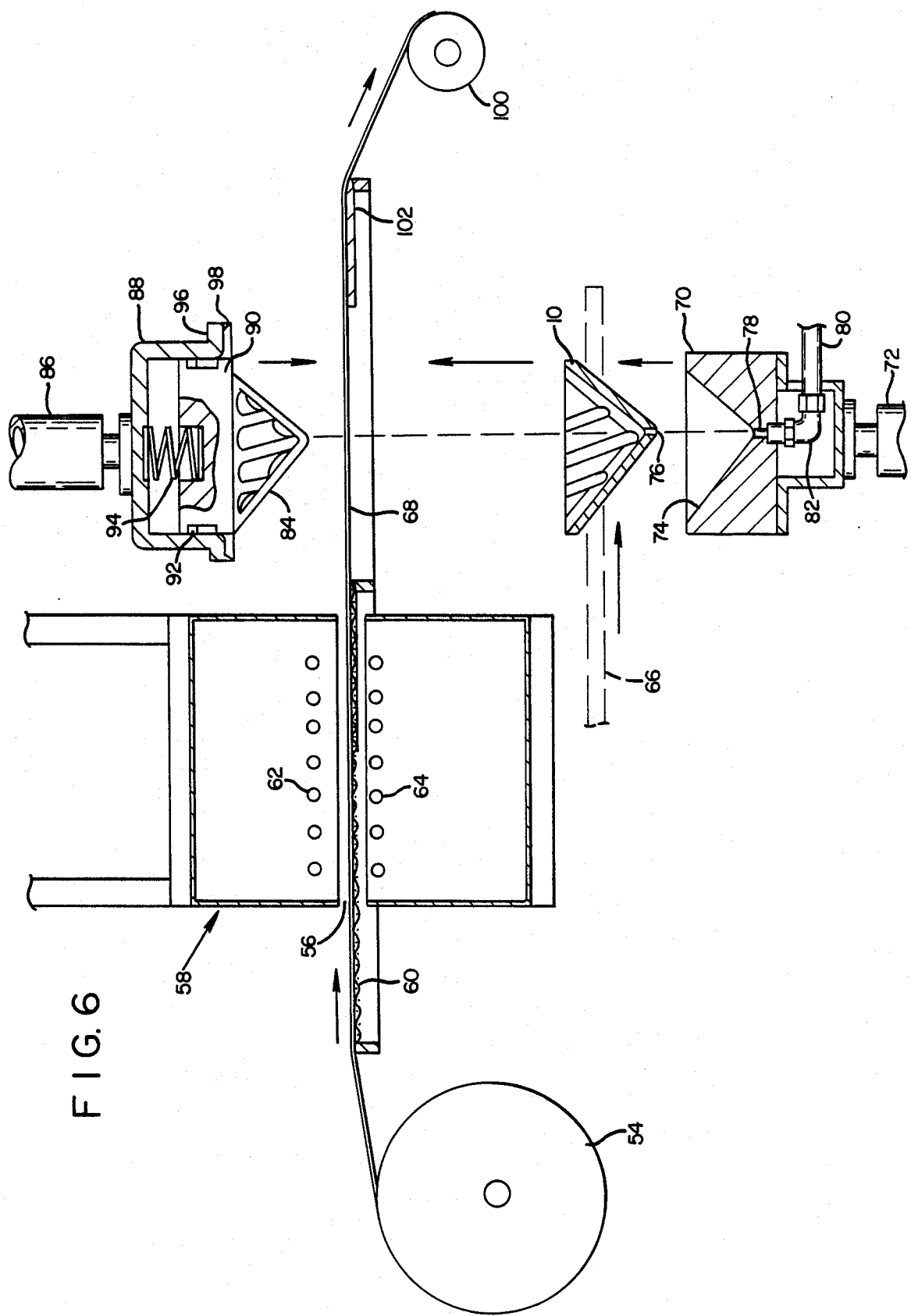

SHIPPING PROTECTOR

BACKGROUND OF THE INVENTION

The present invention relates to a protector for interposition between an object being shipped and a shipping container, and particularly to such a protector providing adequate support as well as cushioning properties for holding the object being shipped.

Protecting means are frequently employed between shipping cartons and an object shipped therewithin, such protecting means is some cases being required by shipping regulations. For instance, molded paper pulp protectors have been employed heretofore for spacing an object such as a piece of furniture from the shipping carton. The protectors are deisgned to absorb shock while at the same time reasonably securely positioning the item of furniture or other object within the carton. One advantageous protector of this type is set forth and claimed in Dorset U.S. Pat. No. 3,762,626 and another in Hurley U.S. Pat. No. 4,120,441. These protectors provide firmness or resistance to crushing while at the same time providing resilience and adaptability of conformity to the shipped object. Furthermore, such protectors are economical in production.

Notwithstanding the advantages of previously available protective devices, it has been found desirable to wrap the furniture or other object being shipped in a blanket of plastic or other material, prior to application of the protectors, in order to avoid any possible scuffing or abrasion due to vibration in shipping. Some have even glued sections of plastic foam to protector interiors. Utilizing a large plastic blanket is awkward and expensive, and securing plastic material to the inside of the pulp protectors unfortunately leads to an additional abrading problem because of hardened glue spots where the plastic and the protector are joined. Not only is the glue a potential source of abrasion, but it is also an emitter of solvents which may have a tendency to discolor or mar furniture or decompose the plastic blanket.

SUMMARY OF THE INVENTION

In accordance with the present invention, a layer of resilient plastic material is heated and self adhered to the interior of a protector device by a vacuum forming or other process so that the plastic layer substantially conforms to the interior relief of the protector while retaining the cushioning property of the protector. A vacuum is suitably drawn through a mold holding the protector whereby the plastic material not only conforms to the interior relief pattern of the protector but also shrinks around the exterior edge thereof. The edge enhances the cushioning properties of the protector and adheres the plastic layer thereto.

As a result, a protector is produced which retains the shock resistance and cushioning of the prior protector, and affords optimized cushioning properties of the plastic which is preferably foam. This end is accomplished without employing glue or other adhesives as would tend to mar furniture surfaces. Nevertheless, the plastic foam conforms to interior pads of the protector which themselves may adaptably conform to the shipped object.

It is accordingly an object of the present invention to provide an improved shipping protector which affords improved cushioning support to the object being shipped.

It is another object of the present invention to provide an improved shipping protector having the advantages of strength and shock resistance as well as non-abrading contact with the object being shipped.

The subject matter of the invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DRAWINGS

FIG. 6 is a side view, partially in cross section, of an apparatus for manufacturing a protector according to the present invention.

DETAILED DESCRIPTION

Figure 1:
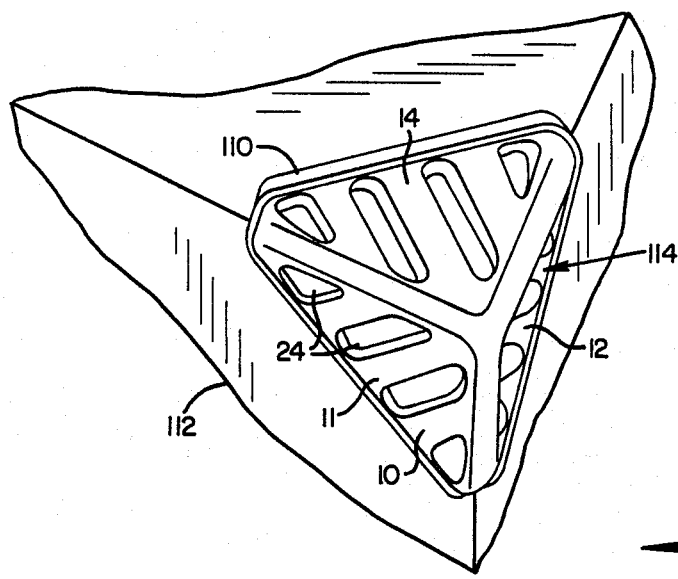
FIG. 1 is a broken away, perspective view illustrating use of a protector according to the present invention.
Figure 3:
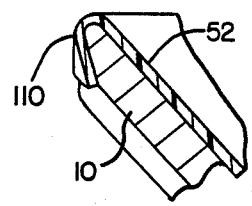
FIG. 3 is a broken away cross sectional view of the protector, as taken at 3—3 in FIG. 2.
Figure 2:
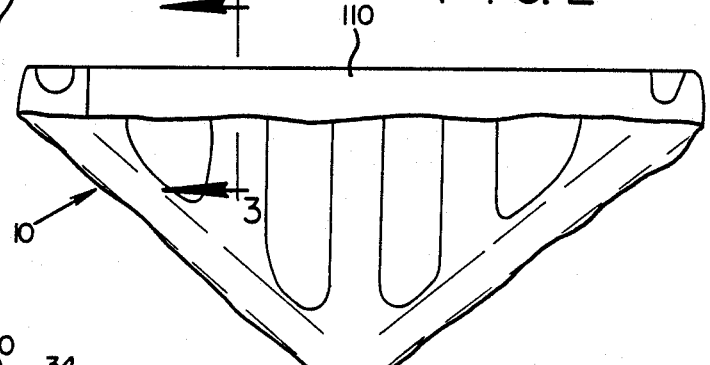
FIG. 2 is a side view of such protector.
Figure 4:
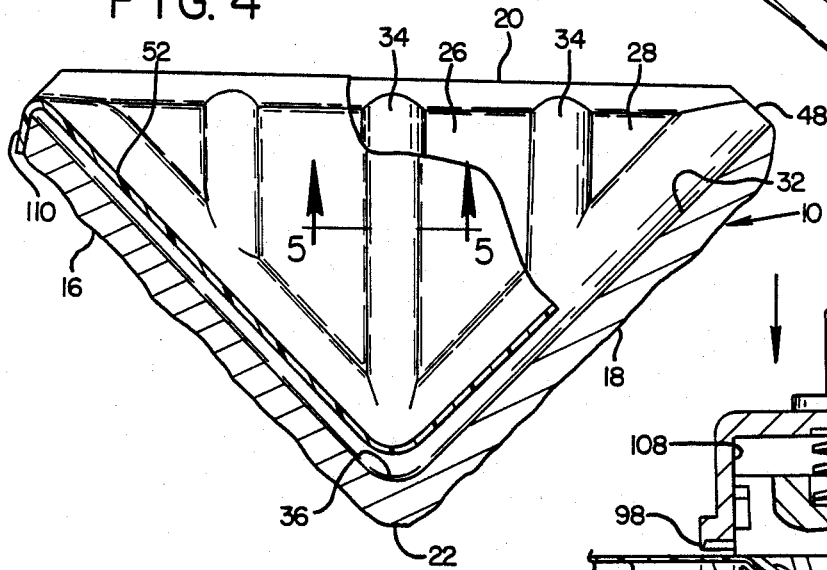
FIG. 4 is a cross sectional, partially broken away, flat view of an inside wall of the protector according to the present invention, said wall being perpendicular to the viewing direction.

By way of example, the invention will be described in combination with the protector of the aforementioned Dorsey U.S. Pat. No. 3,762,626, but it is understood it may alternatively incorporate the protector or guard of Hurley U.S. Pat. No. 4,120,441 or other similar spacing devices. Referring to the drawings and particularly FIGS. 1 through 5, the device according to the present invention thus suitably includes, as a base element, a corner protector 10 as described in the aforementioned Dorsey patent formed from molded pulp in one piece. This molded pulp base includes three mutually perpendicular sides 11, 12 and 14. Each side is suitably triangular in configuration, i.e., each side comprises a relatively thin wall having the shape of an isosceles triangle including first and second sides or edges, 16 and 18, of equal length, and a third side or edge 20 of greater length. The first and second triangular edges, 16 and 18, are joined to corresponding edges of the remaining two sides or walls of the corner protector, that is, edge 16 of wall 14 is joined to side 18 of wall 12, while edge 18 of wall 14 is joined to edge 16 of wall 11. Furthermore, the walls meet at a common apex 22 at the juncture of the first and second edges of each of the triangular walls for completing a hollow article having an exterior and an interior.

The walls of the cellulosic article may be indented at regular intervals between the edges of the walls, i.e., wall 11 may be indented at plural locations indicated at 24. These exterior indentations provide a plurality of separate inwardly directed ribs 26 and 28 on the interior of the article. The ribs 26, 28 are suitably enlarged slightly to provide multiple flat inner pads or faces which are substantially in a plane parallel to the triangular wall in each case. The aforementioned ribs or pads provide a better bearing surface for better conformation to the object being shipped then would be the case if they were not separate and are therefore preferred. Furthermore, the indented structure provides considerable strength and a truss-like structure which resists crushing, while at the same time the thickness of the web of pulp material employed is fairly thin for allowing adequate drying of the pulp during the manufacturing process while also permitting construction of a "thicker" overall cross-section than can be economically molded monolithically from cellulosic material. However, protectors with a single pad per face may alternatively be used.

On the interior of the article, the ribs or pads 26 and 28 of the preferred construction define therebetween a plurality of grooves including corner grooves 32 which extend from the apex of the article along the interior junction of the wall edges to the exterior lower corners thereof and define the outer edges 16 and 18. Between the inwardly directed ribs or pads on each wall there are defined a plurality of side grooves 34, the side grooves separating or rendering indepenent the ribs or pads 26, 28 for allowing conformation to the object being shipped as hereinbefore indicated. The junctures of the wall edges preferably do not extend completely to the base of the article, but rather the article is truncated at the lower corners 48. Thus, the third or base edges are separated from one another and an opening is formed in each case providing communication from a corner groove 32 to the exterior of the article. The indentations 24 provide the ribs 26 and 28 at a plane whereby the intersection of such plane with the corresponding planes for the other two walls will intersect short of the corner groove depth. In other words, the corner grooves are deep enough so that a piece of furniture with straight walls would not reach the bottom of the groove.

Figure 5:
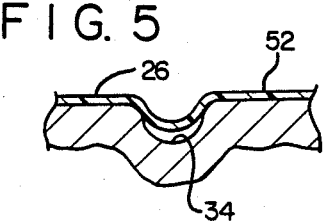
FIG. 5 is a cross sectional view taken at 5—5 in FIG. 4.

According to the present invention, the base protector is provided with a layer 52 of resilient plastic foam material which is adhered to the interior side of the article adapted for receiving the object being shipped. The plastic foam material is self adhered to the interior of the article preferably without the use of glue or any form of adhesive that would cause hard spots in the resultant protector, and not only extends across the interior surface of the aforementioned pads 26, 28, but also conforms substantially to the grooves 34 between pads such that any excess material or wrinkle is gathered within such grooves. As illustrated in FIG. 5, the plastic layer 52 is closely adherent to the pads 26 and 28, but may in some cases extend only partially to the bottom of groove 34 therebetween. The substantially complete conformance of the plastic material to the underlying pulp corner retains the advantage of independent pads while softening the surface thereof. The presence of the plastic material also increases the effective width of the pads 26, 28 to provide additional contact surface of "bearing area".

The layer 52 is formed of a thermally formable plastic sheeting which retains its cushioning properties in its final form. The material is desirably a closed cell foam and may suitably comprise a product known as Microfoam. It may comprise a polypropylene material or a polyethylene material. According to the present invention, advantage is taken of the formable qualities of the material, as well as its cushioning properties.

Referring now to FIG. 6, illustrating in cross section an apparatus for carrying out a method of forming a protector according to the present invention, a roll 54 of the aforementioned plastic sheet material is passed through the entry duct 56 of a heater 58 over a screen 60 between calrod or similar heaters 62 and 64 for bringing the plastic material to a relatively formable or "sagging" condition as it leaves the screen 60. The plastic sheet from coil 54 has substantially uniform thickness.

A pulp protector 10, as hereinbefore described, and preferably as newly formed, is provided upon conveying means 66 underneath the path of the heated and formable plastic sheet 68. Below the protector 10 is disposed a female mold or die 70 supported on an air cylinder 72, wherein the cavity of interior 74 of the mold 70 is adapted to receive the corner base member 10. The interior 74 of the mold may be provided with a topography matching the exterior of base member 10, or may comprise three mutually perpendicular walls adapted to meet with the exterior of the pyramidal shaped protector without the intervening relief. In any case, the female mold is slightly short of the opening edge of article 10.

The apex of member 10 is desirably punctured as indicated at 76, and the cavity 74 in mold 70 is provided with a vacuum duct 78 leading from its lower extremity to coupling hose 80 via connector 82, with the hose 80 being connected to a suitable vacuum pump. Puncture 76 provides communication for drawing the plastic within member 10, advantageously via grooves 32 and directly communicating grooves 34 allowing substantially uniform distribution of vacuum throughout the inner surface of the article.

Above the path of plastic sheet 68 is positioned a male mold 84 preferably adapted to substantially match the interior topography or relief of pulp base member 10. The mold or die 84 is supported from air cylinder 86 by way of a cylinder and piston assembly 88, 90, wherein cylindrical abutment 92 within cylinder 88 prevents the piston 90 from moving farther downwardly than the position as illustrated in FIG. 6. A spring 94 is disposed axially of the piston and cylinder causing male mold or die 84 to be biased in a downward direction. Around the lower exterior edge thereof, on radial flange portion 96, cylinder 88 is provided with a knife edge 98 for severing the plastic material which becomes attached to member 10. The remaining plastic material is suitably received at roller 100 after passing over guide 102.

Figure 7:
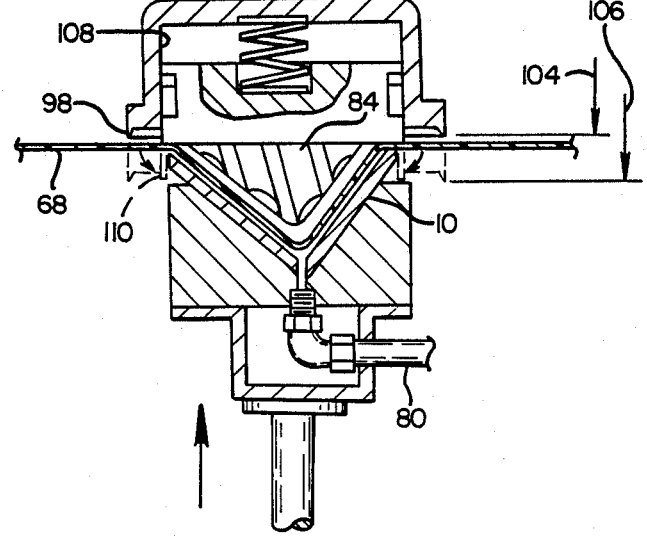
FIG. 7 is a cross-sectional view of a portion of the FIG. 6 apparatus showing a protector according to the present invention being formed.

Considering operation of the FIG. 6 apparatus, the plastic material within heater 58 is heated to the formable condition and moved to a location between upwardly facing female die 70 and downwardly facing male die 84, while a base member 10 is positioned above die 70 as shown. Cylinder 72 is then actuated to move die 70 in an upward direction, for receiving member 10, and cylinder 86 is similarly actuated for moving die 84 in a downward direction, such that the dies meet substantially at the position of heated plastic sheet material 68 as illustrated in FIG. 7. The formable plastic sheet is vacuum formed in the present embodiment by drawing a vacuum via tubing 80 so that it conforms to the interior relief of pulp base member 10, while the male die 84 compresses the same from above and aids in the forming process. The plastic material self adheres to the interior of the base member 10 without the use of adhesives or the like.

When the stroke of cylinder 86 has carried male die 84 downwardly as indicated by arrow 104 to the position shown in full line in FIG. 7, the stroke of the piston continues farther downwardly as illustrated by arrow 106, carrying cylinder 88 downwardly and causing knife edge 98 to sever the plastic sheeting material 68 around the base member. The interior diameter 108 of cylinder 88 is only slightly larger than the exterior dimension of the peripheral edge of base member 10, plus the thickness of the sheeting material, and as the cylinder 88 proceeds farther downwardly, the severed sheeting material is urged downwardly at 110 around the outer peripheral edge of the base member 10. The cylinder 88 is then removed upwardly. The margin 110 of the plastic shrinks in secure gripping relation to the exterior edge of the base 10 for securely holding the plastic to the pulp corner. The resultant configuration is more clearly shown in FIGS. 3 and 4 where the margin 110 is illustrated as formed around the peripheral edge of the base member 10.

The utilization of the article according to the present invention is illustrated in FIG. 1 wherein an object to be shipped, 112, is to be disposed inside a shipping container. The completed article according to the present invention, 114, is illustrated as engaging an upper corner or edge of object 12 and it is understood the exterior of article 114 will substantially match the interior of the shipping container. The margin 110 of the plastic sheeting material, which aids in adhering the sheeting material to the interior of the article, also avoids undesired abrading of the object 112, when the protector 114 is positioned in place, by shielding the outer periphery thereof.

The combination of the pulp protector and the interior resilient plastic material provides the combined advantages of ruggedness and strength of the pulp base member and the enhanced cushioning characteristic of the thermally formable plastic without undue expense. Although vacuum thermoformed, the plastic material has a residual cushioning property, and shrinks around the edge of a base member for securing the two components together. The shrinking and the geometry of the product are advantageously utilized to obtain the "wrap-around" at the edge. No adhesive is required. Although the formation of only one article 114 is illustrated as being formed at one time, it will be appreciated that multiple opposed dies or molds, 70, 84 may be employed to make maximum use of the heated plastic sheet 68. In the broadest sense, the plastic layer can be applied in self adherent relation by means other than vacuum forming, e.g. it could be sprayed on; however vacuum forming is preferred.

While a preferred embodiment of the present invention has been shown and described, it will be apparent to those skilled in the art that many changes and modifications may be made without departing from the invention in its broader aspects. It is therefore intended that the appended claims cover all such changes and modifications as fall within the true spirit and scope of my invention.

I claim:

1. A unitary protector adapted for interposition between a shipping container and an object being shipped for spacing said object within said container, comprising:
    a plurality of substantially rigid walls joined at first edges thereof to provide an article having an exterior side and an interior side adapted for receiving said object, said article having open second edges between which said object is received,
    said walls being indented on said interior side to provide said article with an interior relief including pads adapted for positioning adjacent said object being shipped, and
    a layer of resilient plastic material self-adhered to the interior of said article and substantially conforming to said interior relief of said article for resiliently receiving said object being shipped between said pads in bearing relation.

2. The protector according to claim 1 wherein an outer margin of said layer of plastic material extends around second edges of said walls in substantially gripping relation to said second edges.

3. The protector according to claim 1 wherein said walls of said articles are formed of molded pulp.

4. The protector according to claim 1 wherein said plastic material comprises a closed cell plastic foam material.

5. The protector according to claim 4 wherein said plastic foam material comprises substantially uniform thickness thermoformable plastic sheet.

6. The protector according to claim 1 having a substantially uniform overall web thickness.

7. The protector according to claim 1 wherein said pads for a given interior wall are multiple and substantially coplanar.

8. The method of manufacturing a unitary protector adapted for interposition between a shipping container and an object being shipped, comprising:
    forming an article by joining plural walls at first edges thereof to provide an article which is substantially hollow, including forming interior wall sides thereof with pads for engaging said object, and
    applying a plastic layer in self-adherent relation to the interior of said articles including said pads and around outer edges of said article for providing resilient surfaces for receiving said object.

9. The method of manufacturing a unitary protector adapted for interposition between a shipping container and an object being shipped, comprising:
    forming an article by joining plural walls at first edges thereof to provide an article which is substantially hollow, including forming interior wall sides thereof with pads for engaging said object,
    heating a sheet of plastic material to a formable temperature, and
    vacuum forming said sheet of plastic into the interior of said article by drawing a vacuum substantially through said article causing said plastic substantially to adhere to said pads and within grooves between pads,
    shrinking said sheet of plastic around outer edges of said article in substantially gripping relation thereto, and
    severing said sheet of plastic material around the outer edges of said article.

10. The method according to claim 9 including forming said walls from cellolosic fiber material.

11. The method according to claim 9 including urging said sheet of plastic material toward the interior of said article with a male die substantially conforming to said pads and grooves on the interior of said article, while supporting said article in a female die substantially conforming to the exterior of said article while drawing said vacuum through said female die.

12. The method according to claim 11 including forming an aperture through said article for drawing said vacuum therethrough.

* * * * *

UNITED STATES PATENT AND TRADEMARK OFFICE
CERTIFICATE OF CORRECTION

PATENT NO. : 4,838,427

DATED : June 13, 1989

INVENTOR(S) : Richard D. Hurley

It is certified that error appears in the above-identified patent and that said Letters Patent is hereby corrected as shown below:

Column 1, line 12, "is" should be --in--;
         line 20, "Dorset" should be --Dorsey--.

Column 3, line 58, "of" should be --or--.

Column 4, line 7, "coil" should be --roll--;
         line 13, "of" (first occurrence) should be --or--.

Column 6, line 13, "articles" should be --article--.

Abstract, line 6, "pump" should be --pulp--.

Signed and Sealed this

Twentieth Day of March, 1990

Attest:

JEFFREY M. SAMUELS

Attesting Officer

Acting Commissioner of Patents and Trademarks